United States Patent [19]

Sniadower

[11] Patent Number: 4,981,334
[45] Date of Patent: Jan. 1, 1991

[54] COMPACT OPTICAL FIBER COUPLER

[75] Inventor: Lucjan Sniadower, Paris, France

[73] Assignee: Raynet Corp., Menlo Park, Calif.

[21] Appl. No.: 455,111

[22] Filed: Dec. 22, 1989

[51] Int. Cl.⁵ .............................................. G02B 6/26
[52] U.S. Cl. .............................. 350/96.15; 350/96.18; 350/96.20
[58] Field of Search ............... 350/96.15, 96.16, 96.18, 350/96.19, 96.20

[56] References Cited

U.S. PATENT DOCUMENTS

| | | | |
|---|---|---|---|
| 4,741,585 | 5/1988 | Uken | 350/96.15 |
| 4,747,652 | 5/1988 | Campbell et al. | 350/96.15 |
| 4,759,605 | 7/1988 | Shen et al. | 350/96.15 |
| 4,792,202 | 12/1988 | Zucker et al. | 350/96.16 |
| 4,824,199 | 4/1989 | Uken | 350/96.15 |
| 4,834,482 | 5/1989 | Campbell et al. | 350/96.15 |
| 4,889,403 | 12/1989 | Zucker et al. | 350/96.15 |

Primary Examiner—Frank Gonzalez
Attorney, Agent, or Firm—Dennis E. Kovach

[57] ABSTRACT

An optical coupler for coupling light between a light emitter and an optical fiber includes a substrate for maintaining a bend in an optical fiber through which light can be coupled between an optical fiber core and the light emitter. The substrate includes a cavity which extends in a direction substantially perpendicular to a plane defined by the fiber bend so as to enable the light emitter to be secured to the substrate to minimize a propagation distance of light to be coupled through the substrate. The light emitter includes first and second substantially spherical lenses, one of which being disposed in the cavity so as to increase optical coupling efficiencies and result in a compact coupler design.

11 Claims, 2 Drawing Sheets

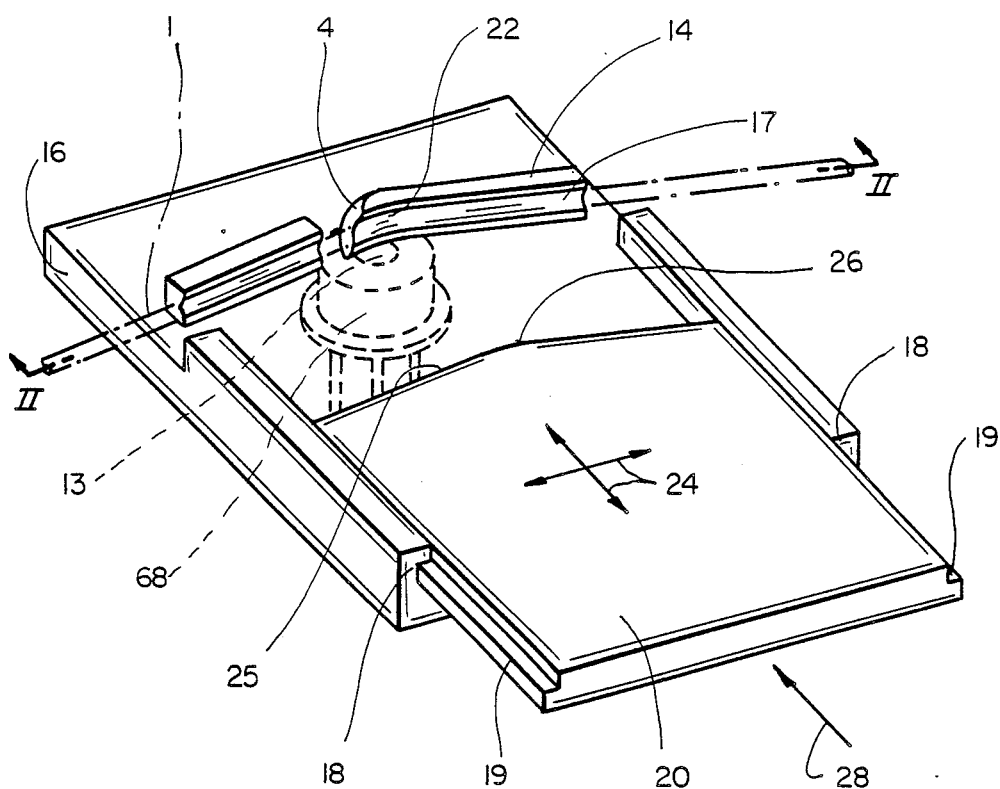
FIG_1
(PRIOR ART)

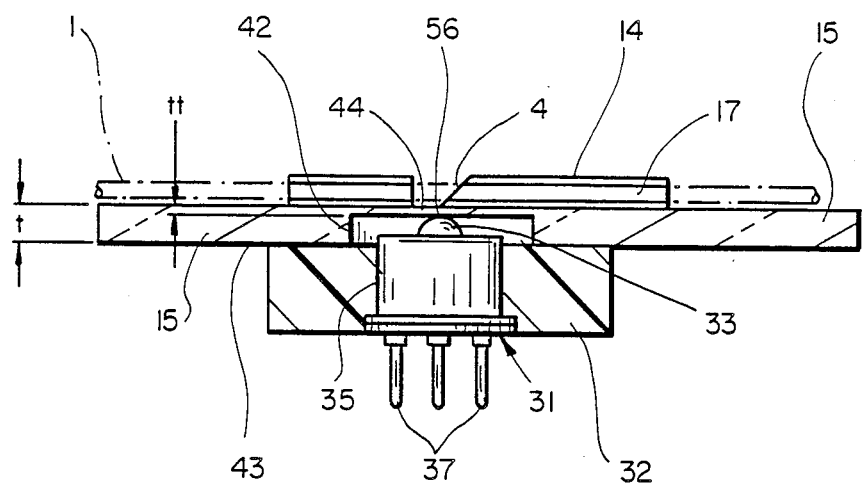
FIG_2
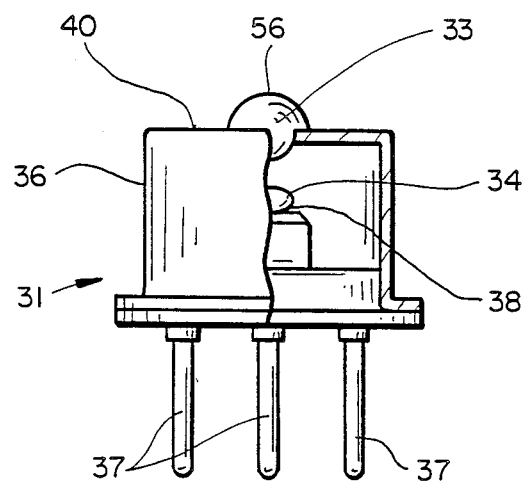
FIG_3
(PRIOR ART)

COMPACT OPTICAL FIBER COUPLER

CROSS REFERENCE TO RELATED APPLICATION

The present application discloses and claims an optical coupler useable in a network disclosed in "Filtering High Order Modes of Short Wavelength Signals Propagating in Long Wavelength Single Mode Fibers" invented by Lucjan Sniadower, a coinventor hereof, the disclosure of which is incorporated herein by reference.

FIELD OF THE INVENTION

The present invention relates to an optical coupler for coupling light between a light emitter and a bent optical fiber by passing the light through a side of the optical fiber.

BACKGROUND OF THE INVENTION

Numerous attempts have been made in the prior art to develop an optical coupler which effectively, efficiently, and inexpensively couples light bewteen an optical fiber and a light emitter such as a light emitting diode (LED), laser, or photodetector. Though numerous approaches have been specified, many require that the optical fiber be terminated and spliced to a coupling device which is disadvantageous since splicing tends to be a craft sensitive and expensive procedure, and splicing also results in unacceptably high optical losses.

Some approaches have avoided the cost and other problems associated with splicing a discreet optical coupler device into an optical fiber network by proposing to pass the light through a side of the optical fiber, preferably at a bend in the fiber, so as to pass light through a cladding of the fiber which surrounds a core of the fiber, and optimally one or more buffer layers surrounding the cladding. One such method which has obtained positive results is disclosed by Uken in U.S. Pat. No. 4,741,585, one of the coinventors herein, the disclosure of which is incorporated herein by reference. Uken teaches coupling light from between a core of an optical fiber which is bent so as to be disposed in a plane, deflecting the light out of the plane so as to pass through a substrate in a direction substantially perpendicular to the fiber plane, and locating a light element along this substantially perpendicular direction. Though this approach results in an optical coupler design which is inexpensive to produce and which produces favorable optical coupling efficiencies, a need continues to exist to improve these efficiencies in applications where optical flux budgets are tight, and a need continues to further simplify the coupler design in networking applications where electrical transmission systems such as copper already offer low cost data transmission solutions.

SUMMARY OF THE INVENTION WITH OBJECTS

It is an object of the invention to address the above-noted concerns and to produce an optical fiber coupler which has an improved simplified design, is compact in size, and is extremely craft insensitive to assemble, and is relatively inexpensive to fabricate.

These and other objects of the invention are achieved by the provision of an optical coupler for coupling light between a light emitter and an optical fiber, comprising:

a light emitter having first and second substantially spherical lens, the second lens being disposed adjacent a light emitting junction and the first lens being disposed within a side of a package for the emitter;

a substrate which includes means for bending the optical fiber in a plane;

means for holding the optical fiber bent against the substrate and aligning a bent portion of the optical fiber in a path acceptable for coupling light between the fiber bent portion and the light emitter;

the substrate having a cavity therein which extends from a side of the substrate which is substantially parallel to the plane and is displaced therefrom, the cavity extending in a direction towards the fiber plane so as to confront the plane through a decreased thickness substrate window;

the light emitter being oriented within a light coupling path between the light emitter and the fiber bent portion such that an output of the first lens is diposed in the cavity adjacent the window.

Preferably, the bending means comprising a fiber guide having a fiber holding and bending channel therein, the fiber guide extending upward from a relatively flat surface of the substrate, the substrate having a substantially uniform thickness in areas surrounding the cavity, a thickness of the substrate window being less than one-half of the uniform thickness of the substrate.

The invention will be further evident by reference to the following drawings and detailed description.

BRIEF DESCRIPTION OF THE DRAWINGS

FIG. 1 illustrates a prior art optical coupler for injecting light into an optical fiber;

FIG. 2 illustrates a view similar to that of FIG. 1 taken along a curved path defined by a bent optical fiber along lines II—II in FIG. 1, with the substrate 16 of FIG. 2 being modified to incorporate features of the invention for injecting light into an optical fiber;

FIG. 3 illustrates a partial cutaway view of a preferred prior art light source for injecting light into a bent optical fiber according to FIG. 2.

DETAILED DESCRIPTION OF THE PREFERRED EMBODIMENTS

FIG. 1 illustrates an optical coupler for injecting light into an optical fiber 1, shown in phantom, the fiber being bent by a fiber guiding channel 17 formed in a fiber guide 14. A substrate 16 has a relatively uniform thickness t across most of its area excluding areas immediately adjacent the fiber guide 14 and member guiding channels 18, and the channel 17 extends upward from the substrate 16. The channel 17 includes a bent portion 22 which bends the optical fiber about a radius of curvature sufficiently small and about an appropriate bend sector angle such that light can be coupled into a glass core of the fiber at the bend by passing through one or more polymeric buffer layers of the fiber and enters the fiber guide 14 which is made of a transparent material. Preferred fiber bend radii are between 2 mm and 15 mm, preferably less than 10 mm, more preferably less than 5 mm, e.g. 3.86 mm; and a preferred sector angle of the bend is less than 90°, optimally about 30°. Light emitted from source 68 is deflected off of surface 4 along a direction substantially parallel to a plane defined by arrows 24 and is coupled into the fiber core. The fiber is maintained in a bent attitude against the channel 17 by being resiliently urged along a direction of arrow 28 by a slideable member 20 which is slideable due to engagement of first and second guiding rails 19 thereof which slide within first and second guiding channels 18 in the substrate 16. The end face 25 of the member 20 has a curved profile portion 26 which optimally conforms to a curved profile of the bent portion 22 of the channel 17 for bending the fiber.

FIG. 2 illustrates a view, taken along a curved line II—II which extends along a longitudinal axis of the optical fiber 1, of an embodiment of the invention which constitutes an improvement to the structure shown in FIG. 1. The substrate 16 of FIG. 1 has been replaced in the FIG. 2 embodiment by substrate 15 which incorporates advantageous features of the invention. Specifically, the substrate 15 includes a cavity 42 which extends from a side 43 of the substrate which lies in a plane which is substantially parallel to the arrow defining plane 24 and is remote therefrom, the cavity 42 extending in a direction substantially perpendicular to the arrow defining plane 24 but preferably being separated slightly therefrom by a substrate window 44. It should be noted that the V-groove which forms the surface 4 can extend into the substrate 15 and can even extend all the way through the window 44. Alternatively, a depth of the cavity can be such that a thickness of the window can be reduced to zero in a vicinity of an apex or a bottom of the groove 4. A second substrate 32 has a channel 35 therein which can house a light element such as a light emitter 31, e.g .LED. Preferably, the light element 31 is secured to the second substrate 32 such that a surface 56 which emits the light is in contact with the substrate window 44, though the surface 56 can be slightly separated from the window 44. According to this construction, a minimum light propagation distance can be designed to exist along the direction substantially perpendicular to the arrow defining plane 24 which minimizes coupling losses due to light drift and results in a very compact coupler design. The cavity 42 can be machined in the substrate 15 or it can be formed in a molding process which can be used to initially produce the substrate 15.

The embodiment of FIG. 2 is most useful for injecting light into the optical fiber 1. FIG. 3 illustrates a partial cutaway perspective view of a preferred prior art light emitter 31 for use according to the invention, the light emitter comprising an LED. The LED 31 includes a light emitting junction 38 which emits light and is focused by a second spherical lens 34 disposed in contact with the light emitting function 38 and all contained within environmentally sealed package 36 having a ring shaped top surface 40. A first spherical lens 33 is secured within a hole in the ring surface 40 for accomplishing further light focusing. Both lenses 33, 34 have a converging light beam output and a relatively short focal length. The package 36 further includes electrical positive, negative, and ground pins 37 on a lower side thereof. A preferred LED is Fujitsu model FED 086K1WD which has a typical optical power output of about 4 milliwatts, this LED having a peak wavelength output of about 865 nm. For 1300 nm transmissions, Fujitsu model FED 130K1000 is preferred.

Preferably, a thickness tt of the substrate window 44 is substantially less than a thickness t of a substantial portion of the substrate 15, in particular a thickness t of the substrate in areas adjacent to but surrounding the cavity 42. In this case the substrate window thickness tt is defined to be the substrate thickness t minus the cavity depth. In particular, a preferred thickness tt is optimally designed taking into consideration the light focusing characteristics of a light guiding path between the optical fiber bent portion and a light sensitive junction of the light emitter 31. The thickness of the window can be less than half that of t, possibly less than one-fourth, one-fifth, and one-tenth that of t, and in extreme cases the window thickness can be made essentially zero in a vicinity of a part thereof immediately below a bottom portion of the light deflector 4 in which case the "window" actually extends into the guide 14. However, removing too much of the light deflecting surface 4 can result in decreased light coupling between the light element and the optical fiber bent portion.

EXAMPLE

An optical coupler was constructed as illustrated in FIG. 2 and which included an optical fiber guiding channel 17 which bent the optical fiber about a radius of curvature of 0.152 inches and about a 30° sector angle. The Fujitsu LED referred to above for 865 nm was used as the light element 31. The substrate thickness t was about 0.060 inches, and the window thickness was about 0.015 inches. The LED was powered at 150 milliamps dc and −35 dBm launch power was launched into a core of a single mode optical fiber obtained from Corning Glassworks referred to as SMF21 10 μm core, as recorded 2 km from the optical coupler.

Though the invention has been described by reference to certain preferred embodiments thereof, the invention is not to be so limited and is only to be limited by the appended claims.

We claim:

1. An optical coupler for coupling light between a light emitter and an optical fiber, comprising:
   a light emitter having first and second substantially spherical lens, the second lens being disposed adjacent a light emitting junction and the first lens being disposed within a side of a package for the emitter;
   a substrate which includes means for bending the optical fiber in a plane;
   means for holding the optical fiber bent against the substrate and aligning a bent portion of the optical fiber in a path for coupling light between the fiber bent portion and the light emitter;
   the substrate having a cavity therein which extends from a side of the substrate which is substantially parallel to the plane and is displaced therefrom, the cavity extending in a direction towards the fiber plane so as to confront the plane through a decreased thickness substrate window;
   the light emitter being oriented within a light coupling path between the light emitter and the fiber bent portion such that an outer surface of the first lens is diposed in the cavity adjacent the window.

2. The coupler of claim 1, the bending means comprising a fiber guide having a fiber holding and bending channel therein, the fiber guide extending upward from a relatively flat surface of the substrate, the substrate having a substantially uniform thickness in areas surrounding the cavity, a thickness of the substrate window being less than one-half of the uniform thickness of the substrate.

3. The coupler of claim 2, the window thickness being less than one-fifth the uniform thickness of the substrate.

4. The coupler of claim 2, the window thickness being less than one-tenth the uniform thickness of the substrate.

5. The coupler of claim 1, further comprising a light deflector for deflecting the light between the light emitter and the optical fiber bent portion.

6. The coupler of claim 1, the light emitter junction being surrounded by the package, the package environmentally sealing the junction.

7. The coupler of claim 6, the first and second lens having a converging light output.

8. The coupler of claim 1, the emitter comprising an LED having a peak output between 800 and 900 nm.

9. An optical coupler for injecting an optical signal into an optical fiber, comprising:
   a light source having a light emitting junction surrounded by a sealed environmental package having a light transparent substantially spherical first lens through which light to be coupled with a bent portion of an optical fiber passes;
   a substate including means for bending and holding the optical fiber in a plane and aligning the fiber bent portion in a path for receiving light from the light source, the light source being oriented so as to emit light in a direction toward said plane;
   a light deflector for deflecting the light from the light source so as to propagate along the plane and towards the fiber bent portion;
   the substrate having a cavity therein which extends from a side of the substrate which is substantially parallel to the plane and is displaced therefrom, the cavity extending in a direction towards the fiber plane so as to confront the plane through a decreased thickness substrate window, the first lens being disposed adjacent the window.

10. The coupler of claim 9, the first lens being attached within a hole on an upper surface of the package.

11. The coupler of claim 10 further comprising a second lens having a spherical outside side, the second lens being attached to the light emitting junction.

* * * * *